United States Patent [19]
Tseng et al.

[11] Patent Number: 5,362,796
[45] Date of Patent: * Nov. 8, 1994

[54] MOLDED CROSSLINKED VINYL LACTAM POLYMER GEL AND METHOD OF PREPARATION

[75] Inventors: Susan Y. Tseng, Staten Island, N.Y.; Philip F. Wolf, Bridgewater, N.J.

[73] Assignee: ISP Investments Inc., Wilmington, Del.

[*] Notice: The portion of the term of this patent subsequent to Jan. 18, 2011 has been disclaimed.

[21] Appl. No.: 104,302

[22] Filed: Aug. 9, 1993

[51] Int. Cl.$^5$ ............................................. C08L 37/00
[52] U.S. Cl. ................................. 524/548; 523/106; 524/555; 526/264
[58] Field of Search ............... 524/548, 555; 523/106; 526/264

[56] References Cited

U.S. PATENT DOCUMENTS

| | | | |
|---|---|---|---|
| 3,933,766 | 1/1976 | Hofmann et al. | 526/263 |
| 4,788,227 | 11/1988 | Yanagihara et al. | 523/106 |
| 4,866,148 | 9/1989 | Geyer et al. | 526/264 |
| 4,889,664 | 12/1989 | Kindt-Larsen et al. | 264/2.6 |
| 5,135,965 | 8/1992 | Tahan | 523/106 |
| 5,274,120 | 12/1993 | Tseng et al. | 548/543 |
| 5,280,049 | 1/1994 | Wolf et al. | 521/64 |

*Primary Examiner*—Paul R. Michl
*Assistant Examiner*—John J. Guarriello
*Attorney, Agent, or Firm*—Marilyn J. Maue; Joshua J. Ward

[57] ABSTRACT

This invention relates to a moldable crosslinked vinyl lactam polymer composition and to a transparent, formed gel product obtained therefrom having desired flexibility coupled with high mechanical strength and dimensional and thermal stability. The invention also relates to the method of preparing said molded gel products.

17 Claims, No Drawings

MOLDED CROSSLINKED VINYL LACTAM POLYMER GEL AND METHOD OF PREPARATION

BACKGROUND OF THE INVENTION

Crosslinked vinylpyrrolidone polymeric powder has been prepared by proliferous polymerization at high temperatures with vigorous agitation as described in copending patent application Ser. No. 057,378, filed May 6, 1993 for COLORLESS, PURIFIED, POLYMERIZABLE COMPOSITION USEFUL FOR THE PRODUCTION OF CROSSLINKED POLYVINYLPYRROLIDONE. Other vinyl lactam crosslinking processes are described in U.S. Pat. Nos. 5,089,910; 5,130,388 and 5,015,708. However, the powder products obtained by these processes are not amenable to molding and lack both mechanical strength and flexibility.

Accordingly, it is an object of this invention to provide a crosslinked vinyl lactam polymer in the form of a gel which is easily molded into a desired shape having desired flexibility coupled with high mechanical strength and dimensional stability.

Another object of the invention is to provide a polymerizable composition which is readily amenable to conventional molding procedures.

Still another object is to provide an economical and commercially feasible process for preparing a molded hydrogel of a crosslinked vinyl lactam polymer.

Yet another object is to provide a strong, flexible molded product having a high Tg temperature.

These and other objects of this invention will become apparent from the following description and disclosure.

THE INVENTION

The molded product of this invention is achieved by
(1) forming a uniform liquid mixture of
   (a) between about 10 and about 30 wt. % of a polymerizable reactant containing at least 55% N-vinyl lactam monomer;
   (b) between about 0.01 and about 10.0 wt. % crosslinking agent;
   (c) between about 60 and about 90 wt. % solvent and
   (d) between about 0.1 and about 5 wt. % of a free radical initiator having a decomposition temperature below the boiling point of the solvent;
(2) introducing said mixture into a dish or mold;
(3) in the absence of agitation and in an inert atmosphere, heating the mixture to between about 50° and about 80° C. for a period of from about 2 to about 5 hours to begin polymerization without displacement of the solvent medium, and then raising the temperature to between about 100° and about 145° C. for an additional period of from about 0.5 to about 3 hours or until a constant viscosity (i.e. gel strength) is reached to complete the crosslinking of the polymer;
(4) recovering the crosslinked polymer in the form of a shaped rubbery intermediate and digesting said intermediate in water to extract and remove soluble monomer, linear polymer and other residuals in the aqueous phase and
(5) recovering a clear, formed, crosslinked vinyl lactam polymer hydrogel from water as the product of the process which product has high mechanical strength and dimensional integrity.

The gel product of this invention is derived from the homopolymerization or copolymerization of N-vinyl pyrrolidone and/or N-vinyl caprolactam which is between about 0.01 and about 10% crosslinked, preferably between about 0.1 and about 2% crosslinked, with a suitable polyfunctional crosslinking agent.

As indicated, the N-vinyl lactam monomer may be combined with a polymerizable comonomer, preferably in an amount not more than 30%. Suitable comonomers are those which are soluble in the reaction solvent and include olefinically unsaturated compounds such as another N-vinyl amide, vinyl acetate, acrylic acid, methacrylic acid, acrylamide, methacrylamide, lower alkyl acrylates or methacrylates, isobutylene, acrylonitrile, vinyl chloride, hydroxyalkyl acrylates or methacrylates, ethyl vinyl ether, vinyl ether, quaternized dimethylamino lower alkyl acrylates or methacrylates and the like.

Representative of the crosslinking agents which can be employed are divinylimidazolidone; the divinyl ether of diethylene glycol; pentaerythritol triallyl ether (PETE); triallyl-1,3,5-triazine-2,4,6-(1H,3H,5H) trione (TATT); ethylene glycol diacrylate; 2,4,6-triallyloxy-1,3,5-triazine; N-vinyl-3(E)-ethylidene pyrrolidone (EVP); 1,7-octadiene; 1,9-decadiene; divinyl benzene; methylene bis(acrylamide); ethylidene bisvinylpyrrolidone (EBVP) etc. In the case of N-vinyl pyrrolidone, the monomer itself is capable of crosslinking the N-vinyl pyrrolidone homopolymer to provide a crosslinked product containing only vinyl pyrrolidone units.

Preferred gels are those products derived from N-vinyl pyrrolidone homopolymer, or N-vinyl pyrrolidone/N-vinyl caprolactam or N-vinyl pyrrolidone/acrylic acid copolymers which are crosslinked with EVP, divinylimidazolidone or EBVP. Most preferred is the EVP crosslinked N-vinyl pyrrolidone homopolymer gel.

The solvent used in the above process is water, lower alkanol, e.g. $C_1$ to $C_4$ alkanol, glycerol or a mixture thereof; although undiluted water is preferred. Although the amount of solvent employed can vary over a wide range, generally between about 65% and 75% of the reaction mixture is sufficient to dissolve all reactive components. If desired, a small amount, e.g. between about 0.001 and about 1.0 wt. %, of an antibacterial or antifungal agent can be added to the reactant mixture or with the solvent to provide antiseptic properties to the formed gel product.

Suitable polymerization initiators, more often employed in a concentration of from about 0.1 to about 3 wt. %, are free radical catalysts having a 10 hour half life and a decomposition temperature below the boiling point of the solvent employed. Such initiators include diacyl peroxides such as diacetyl peroxide, dibenzoyl peroxide, dilauroyl peroxide; peresters such as t-butylperoxy pivalate, t-butyl peroctoate, t-amylperoxy pivalate, t-butylperoxy-2-ethyl hexanolate; percarbonates such as dicyclo hexyl peroxy dicarbonate, as well as azo compounds such as 2,2'-azo-bis(isobutyrolnitrile), 2,2'-azo-bis(2,4-dimethylvaleronitrite), 2,2'-azo-bis(cycanocyclohexane) and mixtures thereof; the organic peroxides being preferred.

The mechanical strength of the hydrogel product can be varied within an acceptably high range by regulating the concentrations of reactive monomer(s) and/or crosslinking agent in the initial uniform mixture before molding. Hence, the mechanical strength varies directly with the amount of monomer and/or crosslinker in the system. Generally, a mechanical strength of from about 1 g/mm² to about 10 g/mm² is considered desirable.

The gel products of this invention, after saturation in from about 1 to about 500 volumes of water, for a period of from about 5 hours to about 2 days, contains between about 1.8 and about 50 wt. % crosslinked polymer, between about 70 to 98 wt. % water and between about 0 to about 20 wt. % of an innocuous additive or a material which is chemically inert in the polymerization, e.g. antiseptic, colorant, preservative and/or any other conventional inactive ingredient.

The present transparent hydrogel products are uniquely suitable as soft contact lenses which can be formed with convex shapes so as to adhere comfortably to the retina of the eye. In this application, the initial moldable mixture may also contain a non-irritating coloring or tinting agent in the color intensity desired.

The present hydrogel products are also applicable as non-irritating surgical or dental prosthesis affixing devices where a degree of flexibility is required. Other uses include vehicles for active ingredient in cosmetic and pharmaceutical applications.

Having generally described the invention, reference is now had to the following examples which illustrate preferred embodiments concerning the preparation and use of the present gels, which examples are not to be construed as limiting to the scope of the invention as more broadly defined above and in the appended claims.

EXAMPLE 1

A homogeneous solution of 5.4 grams of N-vinyl pyrrolidone (VP), 0,022 gram N-vinyl-3(E)-ethylidene pyrrolidone (EVP), 21.6 grams of distilled water and 0.07 gram of tert-butylperoxy pivalate (LUPERSOL 11) was poured into a Petri dish and the dish placed under a blanket of nitrogen in a temperature controlled vacuum oven wherein 20–30 mm Hg was maintained. The solution in this closed system was heated at 65° C. for 3 hours and then at 120° C. for one hour, after which the solution was allowed to cool to room temperature and the resulting rubbery product was then removed from the dish and was introduced into about 500 volumes of distilled water for 15 hours with simultaneous removal and replacement of the water until the mother liquor is free of residual monomer and soluble, non-crosslinked poly-(N-vinylpyrrolidone). During the above water digestion step, the rubbery product swelled to a clear, transparent hydrogel having a gel volume of 18 g. $H_2O$ per g. of crosslinked polymer. This product, having high mechanical strength (3.6 g./mm²) and excellent optical properties finds application as disposable contact lenses.

EXAMPLE 2

A homogeneous solution of 9.6947 grams of N-vinyl pyrrolidone (VP), 0.3103 gram of a mixture of 13.1% EVP and 84.1% VP, 40 grams of distilled water and 0.1470 gram of tert-amylperoxy pivalate (LUPERSOL 554) was poured into a Petri dish and the dish placed under a blanket of nitrogen in a temperature controlled vacuum oven wherein 20–30 mm Hg was maintained. The solution in this closed system was heated at 70° C. for 2 hours and then at 120° C. for one hour, after which the solution was allowed to cool to room temperature and the resulting rubbery product was then removed from the dish and was introduced into about 450 volumes of distilled water for 15 hours with simultaneous removal and replacement of the water until the mother liquor is free of residual monomer and soluble, non-crosslinked poly-(N-vinylpyrrolidone). During the above water digestion step, the rubbery product swelled to a clear, transparent hydrogel having a gel volume of 18 g. $H_2O$ per g. of crosslinked polymer. This product, having high mechanical strength (3.6 g/mm²) and excellent optical properties finds application as disposable contact lenses and other articles of manufacture which require these properties.

EXAMPLE 3

A homogeneous solution of 9.2366 grams of N-vinyl pyrrolidone (VP), 0.7633 gram of a mixture of 13.1% EVP and 84.1% of VP, 40 grams of distilled water and 0.1012 gram of tert-amylperoxy pivalate (LUPERSOL 554) was poured into a Petri dish and the dish placed under a blanket of nitrogen in a temperature controlled vacuum oven wherein 20–30 mm Hg was maintained. The solution in this closed system was heated at 70° C. for 2 hours and then at 120° C. for one hour, after which the solution was allowed to cool to room temperature and the resulting rubbery product was then removed from the dish and was introduced into about 450 volumes of distilled water for 15 hours with simultaneous removal and replacement of the water until the mother liquor is free of residual monomer and soluble, non-crosslinked poly-(N-vinylpyrrolidone). During the above water digestion step, the rubbery product swelled to a clear, transparent hydrogel having a gel volume of 15 g. $H_2O$ per g. of crosslinked polymer. This product, having a higher mechanical strength than that obtained in Example 2, and excellent optical properties finds application as disposable contact lenses and other articles of manufacture requiring these properties.

EXAMPLE 4

A homogeneous solution of 19.0960 grams of N-vinyl pyrrolidone (VP), 0.9078 gram of a mixture of 8.85% EVP and 91.15% of VP, 80 grams of distilled water and 0.3301 gram of tert-butylperoxy pivalate (LUPERSOL 11) was prepared and introduced into 14 50 ml Pyrex beakers (7 gms. solution per beaker). The beakers were placed under a blanket of nitrogen in a temperature controlled vacuum oven wherein 20–30 mm Hg was maintained. The solution in this closed system was heated at 70° C. for 2 hours and then at 110° C. for one hour, after which the solution was allowed to cool to room temperature and the resulting rubbery products were then removed from the beakers and each introduced into about 500 volumes of distilled water for 15 hours with simultaneous removal and replacement of the water until the mother liquor is free of residual monomer and soluble, non-crosslinked poly-(N-vinylpyrrolidone). During the above water digestion step, the rubbery products swelled to a clear, transparent hydrogel having a gel volume of 20 g. $H_2O$ per g. of crosslinked polymer. This product, having high mechanical strength and excellent optical properties finds application as disposable contact lenses and other uses noted above.

EXAMPLE 5

A homogeneous solution of 9.5439 grams of N-vinyl pyrrolidone (VP), 0.4541 gram of a mixture of 8.85% EVP and 91.15% VP, 90 grams of distilled water and 0.5122 gram of tert-butylperoxy pivalate (LUPERSOL 11) was prepared and introduced into 14 50 ml Pyrex beakers (7 g. solution/beaker). The beakers were placed under a blanket of nitrogen in a temperature controlled vacuum oven wherein 20–30 mm Hg was maintained. The solution in this closed system was heated at 70° C. for 2 hours and then at 110° C. for 2 hours, after which the solution was allowed to cool to room temperature and the resulting rubbery products were then removed from the beakers and each introduced into about 500 volumes of distilled water for 15 hours with simultaneous removal and replacement of the water until the mother liquor is free of residual monomer and soluble, non-crosslinked poly-(N-vinylpyrrolidone). During the above water digestion step, the rubbery products swelled to a clear, transparent hydrogel having a gel volume of 40 g. $H_2O$ per g. of crosslinked polymer. This product, having high mechanical strength and excellent optical properties finds application as disposable contact lenses and other uses noted above.

EXAMPLE 6

A homogeneous solution of 5.4 grams of N-vinyl pyrrolidone (VP), 0.022 gram N-vinyl-3(E)-ethylidene pyrrolidone (EVP), 21.6 grams of distilled water and 0.07 gram of tert-butylperoxy pivalate (LUPERSOL 11) is poured into a Petri dish and the dish placed under a blanket of nitrogen in a temperature controlled oven under atmospheric pressure. The solution in this closed system is heated at 65° C. for 3 hours and then at 120° C. for one hour, after which the solution is allowed to cool to room temperature and the resulting rubbery product was then removed from the dish and was introduced into about 200 volumes of distilled water for 15 hours with simultaneous removal and replacement of the water until the mother liquor is free of residual monomer and soluble, non-crosslinked poly-(N-vinylpyrrolidone). During the above water digestion step, the rubbery product swells to a clear, transparent hydrogel having a gel volume of 18 g. $H_2O$ per g. of crosslinked polymer. This product, having high mechanical strength (3.6g/mm$^2$) and excellent optical properties finds application as disposable contact lenses.

EXAMPLE 7

Example 1 is repeated except that the homogeneous solution is poured into a 1 inch square mold. The hydrogel product recovered has similar mechanical strength and a high dimensional stability.

EXAMPLE 8

Example 1 is repeated except that 0,002 gram of an antiseptic agent, e.g. gentamicin, penicillin, sulfanilamide, tyrothricin, and the like, is added to the homogeneous solution. This hydrogel product can be cast as a thin film and used as a wound covering.

EXAMPLE 9

Example 2 is repeated except that the EVP in the monomer mixture of EVP/VP is replaced with EBVP (divinylimidazolalone). The product is similar to that produced in Example 2.

EXAMPLE 10

Example 2 is repeated except that the procedure of the homogeneous solution poured into the Petri dish is 9.7 grams of a 50/50 mixture of VP and N-vinyl caprolactam, 0.02 g. of EBVP, 40 grams of distilled water and 0.15 g. of t-butyl peroctate. The hydrogel product is similar to that obtained in Example 2.

What is claimed is:

1. A moldable composition consisting essentially of a uniform mixture of
   (1) between about 10 and about 30 wt. % of a polymerizable N-vinyl lactam monomer;
   (2) between about 0.01 and about 10 wt. % non-polymeric crosslinking agent;
   (3) between about 60 and about 90 wt. % solvent selected from the group of water, $C_1$ to $C_4$ alkanol or a mixture thereof and
   (4) between about 0.1 and about 5 wt. % of a free radical initiator having a decomposition temperature below the boiling point of said solvent.

2. A flexible molded hydrogel derived from the composition of claim 1, having a mechanical strength of between about 1 g/mm$^2$ and about 10 g/mm$^2$ and consisting of
   (a) between about 2 and about 30 wt. % of the 0.05–2% crosslinked N-vinyllactam polymer;
   (b) between about 70 and about 98 wt. % water and
   (c) between 0 and about 20 wt. % of an antiseptic agent and/or an inert additive.

3. The hydrogel of claim 2 wherein component (a) is a crosslinked N-vinyl lactam homopolymer.

4. The hydrogel of claim 2 wherein the crosslinked component (a) contains a mixture of N-vinylpyrrolidone and N-vinyl caprolactam units.

5. The process of forming the flexible molded hydrogel of claim 2 which comprises:
   (1) forming a uniform liquid mixture of
      (a) between about 10 and about 30 wt. % of a polymerizable N-vinyl lactam monomer;
      (b) between about 0.01 and about 10 wt. % non-polymeric crosslinking agent;
      (c) between about 60 and about 90 wt. % solvent
      (d) between about 0.1 and about 5 wt. % of a free radical initiator having a decomposition temperature below the boiling point of said solvent and
      (e) optionally between 0 and about 20 wt. % of an antiseptic agent and/or an inert additive;
   (2) introducing said mixture into a dish or mold;
   (3) in the absence of agitation and in an inert atmosphere, heating the mixture to between about 50° and about 80° C. for a period of from about 2 to about 5 hours to begin polymerization without displacement of the solvent medium, and then raising the temperature to between about 100° and about 145° C. for an additional period of from about 0.5 to about 3 hours or until a constant viscosity is reached to complete the crosslinking of the polymer;
   (4) recovering the crosslinked polymer in the form of a shaped rubbery intermediate and digesting said intermediate in water to swell the polymer and to extract and remove soluble monomer; linear polymer and other residuals in the aqueous phase and
   (5) recovering a clear, formed, crosslinked vinyl lactam polymer hydrogel from water as the product of the process which product has high mechanical strength and dimensional integrity.

6. The process of claim 5 wherein component (a) is a crosslinked N-vinyl lactam homopolymer.

7. The process of claim 5 wherein component (a) is a mixture of N-vinylpyrrolidone and N-vinyl caprolactam units.

8. The process of claim 5 wherein component (e) is present and is an antiseptic agent.

9. The process of claim 5 wherein step (3) is carried out under a pressure of from about 15 mm Hg and about atmospheric pressure.

10. The process of claim 5 wherein component (b) is 1-vinyl-3(E)-ethylene pyrrolidone.

11. The process of claim 5 wherein component (b) is ethylidene bis(N-vinyl pyrrolidone).

12. The process of claim 5 wherein component (d) is a free radical peroxide initiator.

13. The process of claim 12 wherein said initiator is t-butylperoxy pivalate.

14. The process of claim 12 wherein said initiator is t-amylperoxy pivalate.

15. The composition of claim 1 wherein said cross-linking agent is N-vinyl-3(E)-ethylidene pyrrolidone.

16. The composition of claim 1 wherein said cross-linking agent is a mixture of N-vinyl-3(E)-ethylidene pyrrolidone and N-vinylpyrrolidone.

17. The process of claim 5 wherein component (b) is a mixture of N-vinyl-3(E)-ethylidene pyrrolidone and N-vinylpyrrolidone.

* * * * *